April 14, 1942.  H. O. HEM  2,279,678
WEIGHING SCALE
Filed Sept. 7, 1939  2 Sheets-Sheet 1
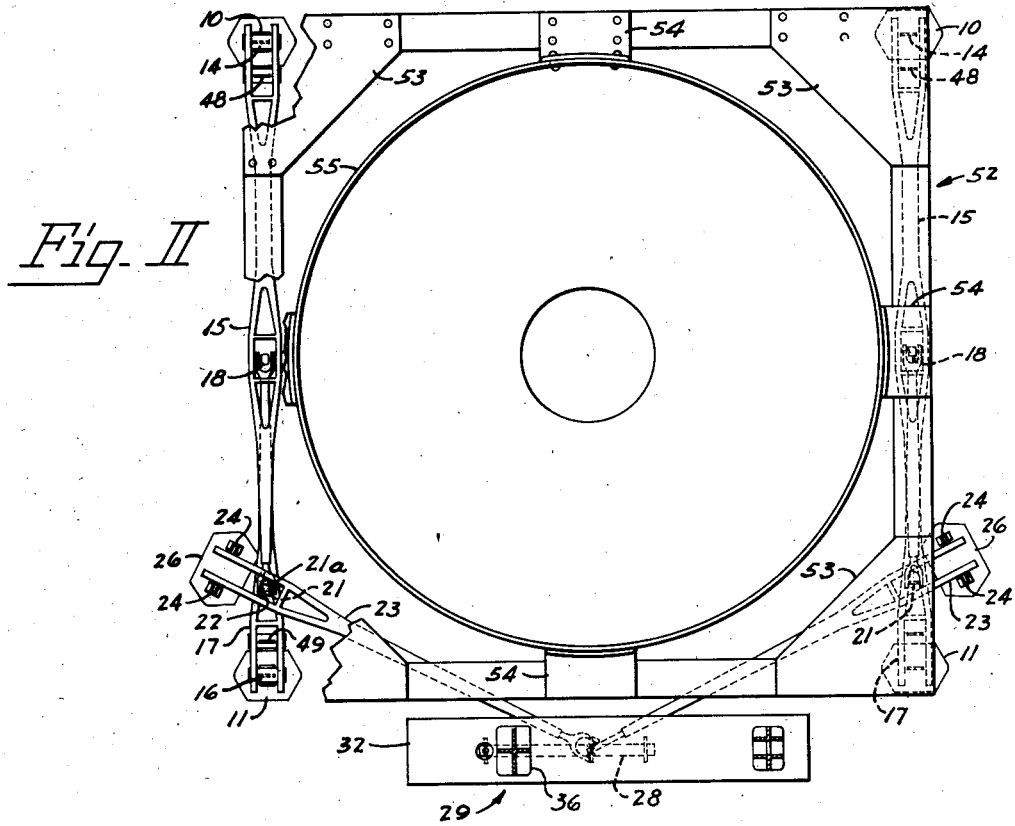
Fig. II
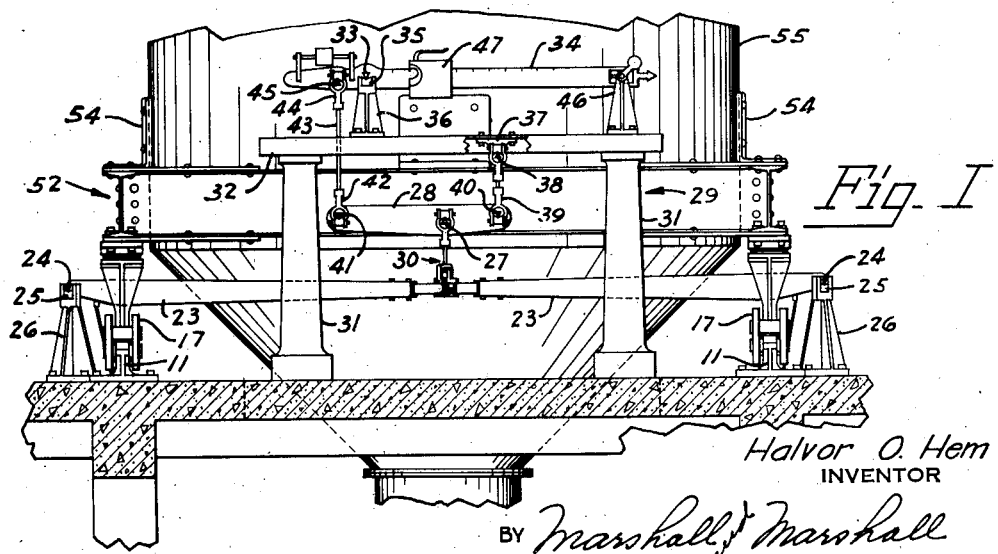
Fig. I
Halvor O. Hem
INVENTOR
BY Marshall & Marshall
ATTORNEYS April 14, 1942. H. O. HEM 2,279,678
WEIGHING SCALE
Filed Sept. 7, 1939 2 Sheets-Sheet 2
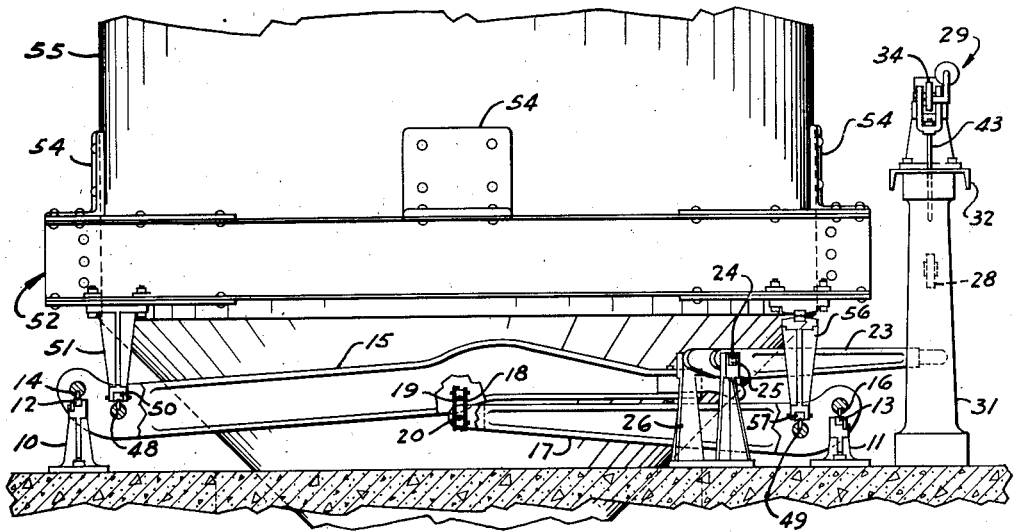
Fig. III
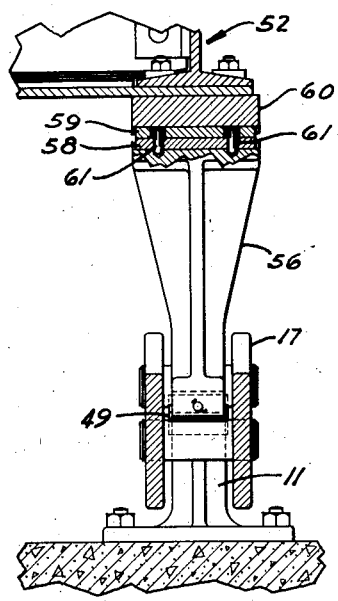
Fig. V
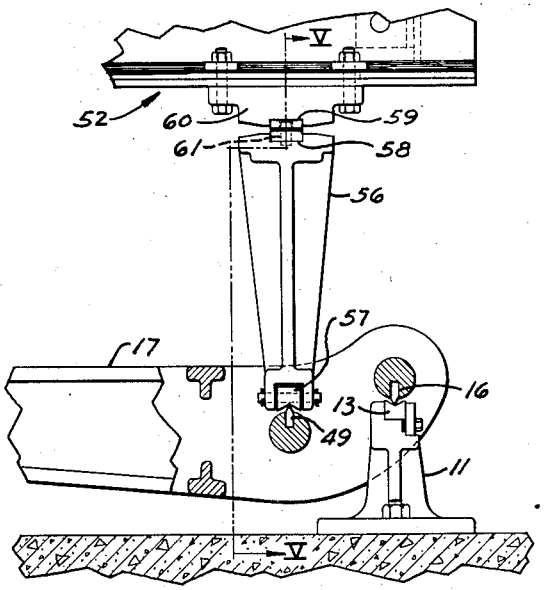
Fig. IV
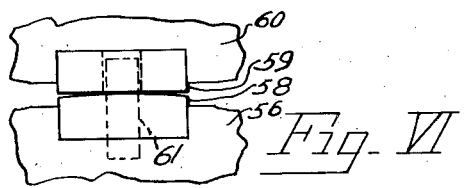
Fig. VI
Halvor O. Hem
INVENTOR
BY Marshall & Marshall
ATTORNEYS Patented Apr. 14, 1942

2,279,678

UNITED STATES PATENT OFFICE 2,279,678

WEIGHING SCALE

Halvor O. Hem, Toledo, Ohio, assignor to Toledo Scale Company, Toledo, Ohio, a corporation of New Jersey Application September 7, 1939, Serial No. 293,791

9 Claims. (Cl. 265—71)

This invention relates to weighing scales, and more particularly to hopper scales adapted to weigh heavy loads and in which the commodity receiving hopper extends through the horizontal axis of the load supporting lever system.

Scales for weighing heavy loads employing a hopper for the reception of the material to be weighed very frequently are constructed in such a manner that the hopper extends through the floor into a lower room. This requires an opening in the floor for the hopper to pass through and a load supporting lever system which has an open center. When such a scale is installed in an old building the provision of such hole weakens the floor considerably and, due to the presence of conveyors or other equipment immediately below, it is not always possible to give it its original strength by shoring; so that when a heavy load is placed in the hopper considerable deflection takes place which results in strains being set up in the lever system and the bearings being subjected to cramps and binds leading to excessive wear of the pivots.

The levers heretofore generally employed for hopper scales were of the so-called "pipe lever" construction. They consist of a pipe with a crosshead at each end in which the fulcrum and load pivots are fixed. The crosshead on one end of one of these levers is extended in one direction and this extension forms a lever arm for connection to another lever for the transmission of the load moment to the counterbalancing mechanism in the usual manner. The tubes of these pipe levers are very apt to twist since they are subjected to considerable torsional strains as it is impossible to make them of such size as to be perfectly rigid under a heavy load.

The principal object of the invention is the provision of an improved load supporting lever system in which torsional deflections are eliminated.

Another object is the provision of improved means for preventing pivot wear and "out-of-plumb" connections.

Another object is the provision of a lever system which is adaptable for use in scales having hoppers of any desired shape and size; and, A still further object is the provision of a load supporting bracket which automatically adjusts itself to a change of a condition in a lever system and transmits the weight of a load in a directly vertical line when such adjustment has taken place.

These, and other objects and advantages will be apparent from the following description in which reference is had to the accompanying drawings, illustrating preferred embodiments of the invention and in which similar reference numerals refer to similar parts throughout the several views.

In the drawings:

Fig. I is a front elevational view of a scale embodying the invention, portions of the hopper being broken away.

Fig. II is a plan view thereof.

Fig. III is a side elevational view.

Fig. IV is an enlarged side elevational view of an alignable hopper bearing, fragments of the lever and hopper frame being shown.

Fig. V is an enlarged front elevational view sectioned along the line V—V of Fig. IV; and, Fig. VI is a further enlarged fragmentary front elevational view showing a locking joint employed in the mechanism.

Referring to the drawings in detail:

The load supporting lever system as illustrated is mounted directly upon a foundation, which usually is a floor of a building, by means of fulcrum stands 10 and 11. Each of these stands has clamped in its upper end suitable V bearings 12 and 13 respectively. The bearings 12 in the stands 10 support fulcrum pivots 14 which extend across the bifurcated ends of long levers 15. In a similar manner the bearings 13 support fulcrum pivots 16 in a pair of short levers 17, each mounted directly underneath a long lever 15 and in its vertical plane. The stands are so located upon the foundation that the levers extend parallel to each other, one pair, consisting of a long lever 15 and a short lever 17, on each side of an opening which is cut through the floor. A link 18, which is provided with suitable bearings, engages oppositely directed pivots 19 and 20 in the levers 15 and 17 respectively in the usual manner.

Nose pivots 21 in the free ends of the long levers 15 are connected by means of stirrups 21a (Fig. II) to load pivots 22 in extension levers 23 which, by means of fulcrum pivots 24, are mounted upon suitable bearings 25 in fulcrum stands 26. The fulcrum stands 26 are so located with respect to the nose of the lever 15 that the extension levers 23 converge at a point directly beneath a load pivot 27 in a so-called shelf or bench lever 28 which forms a part of the load counterbalancing mechanism 29 (Figures I and II). An articulated stirrup 30 operatively connects the extension levers 23 to the shelf lever 28.

From the aforegoing description it will be seen that the lever mechanism herein described is not subjected to any torsional strains. The moment of the load is transmitted to the counterbalancing mechanism undiminshed by any deflections since the levers of the type described can be made rigid. Furthermore, the space between the two pairs of parallelly mounted levers is entirely open and free from all truss or tie rods so that a hopper of any shape may project downwardly between the levers.

The load counterbalancing mechanism 29 illustrated is of usual construction and comprises two vertical pillars 31 spaced from each other and supporting a shelf 32.

A fulcrum pivot 33 of a load counterbalancing beam 34 is rockingly mounted upon a suitable bearing 35 in a fulcrum stand 36 which is bolted upon the shelf 32. This shelf is preferably of steel construction and to the under surface of the horizontal flange is bolted a bracket 37 which supports a pivot 38 forming a suspension point for a stirrup 39 which, with its bearings, serves as a support for a fulcrum pivot 40 of the shelf lever 28. Power pivot 41 in the other free end of the lever 28 engages bearings in a stirrup 42 which, by means of a rod 43, is articulated to a stirrup 44 suspended, by means of a suitable bearing, from a load pivot 45 in the load counterbalancing beam 34. A trig lock 46 is provided for the opposite end of the beam 34 which is graduated as customary and provided with a sliding poise 47.

Although in this embodiment of the invention a so-called beam scale is provided to determine the weight of loads, it should be apparent that other forms of load counterbalancing and indicating means may be employed with equal facility.

For supporting the load to be weighed the levers 15 and 17 are provided with load pivots 48 and 49 which are in spaced relation to the fulcrum pivots. These pivots are upwardly directed and the pivot 48 engages a bearing 50 located in a bracket 51 bolted to the underside of a structural steel rectangular frame 52. This frame is suitably braced by means of gusset plates 53 (Figure II) and forms a support for angle brackets 54 which are riveted to the sides of a hopper 55. The other legs of these angle brackets are riveted to the rectangular frame 52, the hopper 55 and the frame 52 thus becoming an integral part.

These hoppers usually have a conical bottom which projects through the opening in the floor, hereinbefore referred to.

To compensate for any deflection of the foundation when heavy loads are placed on the scale to prevent "binding" of the bearings and thus excessive wear of the pivots, the frame 52 is supported upon the load pivots 49 in the short levers 17 by means of rocking, strut-like brackets 56. Each of these brackets is equipped with a suitable bearing 57 in its lower end which engages one of the load pivots 49. The upper end of each bracket 56 has an inset steel plate 58 which is ground cylindrical, the radial point of this cylinder being located on the edge of the load pivot 49. Resting upon the cylindrical surface of the plate 58 is a plate 59 which is similar in shape to the plate 58 with the exception that its face is flat and not cylindrical. (Fig. VI.) This plate is inset in a bracket 60 bolted to the underside of the structural steel frame 52.

To prevent the bracket 56 from being displaced from its substantially vertical position, hardened steel pins 61 are studded into the plate 58 and these project freely into suitably spaced holes in the plate 59, there being sufficient clearance between the pins and these holes so that the bracket 56 may rock slightly. The function of this improved structure should now be apparent.

As the load is progressively accumulating in the hopper the strains in the foundation increase and the floor becomes slightly bowed and consequently the distance between the upper ends of the brackets 10 and 11 decreases. Consequently the distance between the load pivots also decreases and if both bearing brackets which support the hopper were rigid in respect to the frame 52 a binding action would take place between the knife edges and the V of the bearings resulting in excessive pivot wear if not in an incorrect determination of the weight of the load. According to the present invention, however, the bracket 56, which supports the frame on the load pivots of the short lever, is constructed as hereinbefore described, so that when the distance between the pivots shortens the frame, being positioned on the pivots 48, by means of a rigid bracket, operates to turn the strut-like bracket 56 about its axis on the pivot 49 but since the face of the inset plate 58 is cylindrical, the point at which the plate 59 engages the plate 58 in the bracket 56 rollingly shifts to compensate for the change in the pivot distance thus the weight still acts downwardly in a vertical line on the pivots.

Depending upon the method of shoring or supporting the floor it is also possible that the floor or support will assume a slightly convexed contour; in that case, the distance between the pivots in the short lever and the long lever increases but it should be apparent this is also compensated for automatically, the only difference being that the bracket 56 rocks in the opposite direction.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, load receiving mechanism, load counterbalancing mechanism operatively connected thereto, said load receiving mechanism comprising load supporting levers, a load receiver, a plurality of means for pivotally supporting said load receiver upon said load supporting levers, one of said supporting means being rigid with said load receiver and the other of said supporting means comprising a member rigid with said load supporting means and having a flat surface and a bracket pivotally mounted upon one of said levers and having a cylindrical surface at its upper end adapted for engagement with said flat surface on said member rigid with said load receiver, means for preventing substantial relative displacement of said brackets, said means comprising a pin studded into said bracket pivotally supported upon said lever and a hole in said member rigid with said receiver for the reception of said pin, the diameter of said hole being slightly larger than the diameter of said pin.

2. In a device of the class described, in combination, load receiving mechanism, load counterbalancing mechanism operatively connected thereto, said load receiving mechanism comprising load supporting levers, a load receiver, a plurality of means for pivotally supporting said load receiver upon said load supporting levers, one of said supporting means being rigid with said load receiver and the other of said supporting means comprising a member rigid with said load supporting means and having a flat surface and a bracket pivotally mounted upon one of said levers and having a cylindrical surface at its upper end adapted for engagement with said flat surface on said member rigid with said load receiver and means for preventing substantial relative displacement of said brackets.

3. In a device of the class described, in combination, load receiving mechanism, load counterbalancing mechanism operatively connected thereto, said load receiving mechanism comprising load supporting levers, a load receiver, a plurality of means for pivotally supporting said load receiver upon said load supporting levers, one of said supporting means being rigid with said load receiver and the other of said supporting means being located at a considerable distance from the first-mentioned supporting means, such distance being variable under varying conditions, the second-mentioned means comprising a member rigid with said load receiver and having a flat surface and a bracket pivotally mounted upon one of said levers and having a cylindrical surface at its upper end, said cylindrical surface being curved about the axis of the pivotal mounting of said bracket and engaging said flat surface on said member rigid with said load receiver for rolling movement toward and away from the first-mentioned supporting means.

4. A device according to claim 3, in which the supporting means rigid with said load receiver are disposed at one end thereof and the other of said supporting means are disposed at the other end thereof.

5. In a device of the class described, in combination, a load supporting lever mechanism, load receiving means mounted thereon and a load counterbalancing mechanism actuated thereby, said lever mechanism comprising two pairs of parallelly spaced levers, each pair comprising a long lever and a short lever, said short lever being mounted in the vertical plane passing through said long lever, stands for rockingly supporting each of said pairs of levers, a pair of extension levers each having a fulcrum pivot, a load pivot and a power pivot, fulcrum stands for receiving said fulcrum pivots in said extension levers, connections between said long levers and said load pivots in said extension levers, and said fulcrum stands for said extension levers being adapted to be positioned relative to said pairs of parallelly mounted levers so that said power pivots in said extension levers are adapted to be connected to said load counterbalancing mechanism in substantially the same vertical plane.

6. In a device of the class described, in combination, load receiving means, load counterbalancing mechanism operatively connected thereto, said load receiving means comprising two pairs of load supporting levers, means for mounting each pair of said levers parallel to but independent of the other pair upon a support, a pair of extension levers, each of said pair of extension levers being operatively connected to one of said pairs of load supporting levers and said extension levers being adapted for attachment to said load counterbalancing mechanism in substantially the same vertical plane.

7. In a device of the class described, in combination, load receiving means, load supporting lever mechanism, means for mounting said load receiving means upon said lever mechanism, and a load counterbalancing mechanism operatively connected to said load supporting lever system, said means for mounting said load receiving means upon said lever mechanism including a strut-like supporting bracket pivotally mounted upon said lever mechanism and having a surface curved about the axis of its pivotal mounting and engaging a surface of said load receiving means to rock freely thereon and permit relative movement of said load receiving means and the axis of pivotal mounting of said strut-like supporting member.

8. In a device of the class described, in combination, load supporting lever mechanism, load receiving means mounted upon said load supporting lever mechanism, load counterbalancing mechanism operatively connected to said load supporting lever mechanism and means for mounting said load receiving means upon said load supporting lever mechanism, said means comprising a pair of bearing brackets rigidly connected to said load receiving means and having flat bearing surfaces, and a pair of bearing brackets pivotally engaging said load supporting lever mechanism and having curved bearing surfaces in rocking engagement with the flat bearing surfaces of the brackets that are rigidly connected to the load receiving means.

9. In a device of the class described, in combination, load supporting lever mechanism having load supporting pivots, load receiving means mounted upon said load supporting lever mechanism, load counterbalancing mechanism operatively connected to said load supporting lever mechanism and means for mounting said load receiving means upon such pivots of said load supporting lever mechanism, said means including a bracket and a bearing in the lower end of said bracket for engagement with one of such load supporting pivots in said lever mechanism, said bracket having a curved upper surface to engage a bearing surface of and rockably support said load receiving means with the vertical distance between the pivot engaged by said bracket and the bearing surface engaged by the curved upper surface of said bracket remaining constant throughout rocking movements of said bracket.

HALVOR O. HEM.